(12) United States Patent
Kobayashi et al.

(10) Patent No.: US 8,366,286 B2
(45) Date of Patent: Feb. 5, 2013

(54) LIGHT-TRANSMISSIVE INPUT DEVICE AND METHOD OF MANUFACTURING THE SAME

(75) Inventors: Kiyoshi Kobayashi, Miyagi-ken (JP); Takashi Asakawa, Miyagi-ken (JP); Shinichi Higuchi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 13/418,926

(22) Filed: Mar. 13, 2012

(65) Prior Publication Data

US 2012/0170283 A1    Jul. 5, 2012

Related U.S. Application Data

(63) Continuation of application No. PCT/JP2011/055526, filed on Mar. 9, 2011.

(30) Foreign Application Priority Data

Mar. 11, 2010 (JP) ................................. 2010-054264

(51) Int. Cl.
*F21V 33/00* (2006.01)
(52) U.S. Cl. ........... 362/85; 362/97.1; 362/351; 29/825; 29/846; 345/173; 345/174
(58) Field of Classification Search .............. 29/825, 29/846; 345/173, 174; 359/609, 613; 362/85, 362/97.1, 97.2, 351
See application file for complete search history.

(56) References Cited

U.S. PATENT DOCUMENTS

| 6,814,452 B2 * | 11/2004 | Kusuda ........................ 359/613 |
| 7,339,579 B2 * | 3/2008 | Richter et al. ................ 345/173 |
| 7,358,741 B2 | 4/2008 | Sato et al. |
| 2005/0146516 A1 | 7/2005 | Nishiyama |
| 2008/0129317 A1 | 6/2008 | Oba |
| 2011/0018560 A1 | 1/2011 | Kurashima |
| 2012/0247937 A1 * | 10/2012 | Saito et al. .................... 200/512 |
| 2012/0249451 A1 * | 10/2012 | Higuchi ........................ 345/173 |

FOREIGN PATENT DOCUMENTS

| JP | 4-31231 | 2/1992 |
| JP | 9-212302 | 8/1997 |
| JP | 11-66996 | 3/1999 |
| JP | 2001-282454 | 10/2001 |
| JP | 2005-173970 | 6/2005 |
| JP | 2005-337773 | 12/2005 |
| JP | 2008-140130 | 6/2008 |
| JP | 2009-169720 | 7/2009 |
| JP | 2010-44453 | 2/2010 |
| JP | 2011-28535 | 2/2011 |

OTHER PUBLICATIONS

Search Report dated Jun. 14, 2011 from International Application No. PCT/JP2011/055526.

* cited by examiner

*Primary Examiner* — Stephen F Husar

(74) *Attorney, Agent, or Firm* — Beyer Law Group LLP

(57) ABSTRACT

A lower surface and an upper surface are provided in a detection panel 2. Lower electrode layers 11*a* and 11*b*, a lower wiring pattern 15, and a lower land portion 13 formed on the lower surface are covered with upper shielding layers 28*a* and 28*c* of the upper surface, and an upper electrode layer 21, an upper wiring pattern 25, and an upper land portion 23 formed in the upper surface are covered with lower shielding layers 19*a* and 19*b* of the lower surface. Therefore, an effect of a decorative area shielding light may be enhanced, and thus an electrical shielding effect may further be exhibited.

22 Claims, 6 Drawing Sheets

LIGHT-TRANSMISSIVE INPUT DEVICE AND METHOD OF MANUFACTURING THE SAME

CLAIM OF PRIORITY

This application is a Continuation of International Application No. PCT/JP2011/055526 filed on Mar. 9, 2011, which claims benefit of Japanese Patent Application No. 2010-054264 filed on Mar. 11, 2010. The entire contents of each application noted above are hereby incorporated by reference.

BACKGROUND OF THE INVENTION

1. Field of the Invention

The present invention relates to a light-transmissive input device capable of transmitting light and performing an input operation, and more particularly, to a light-transmissive input device and a method of manufacturing the same capable of enhancing a light-shielding function of a decorative area covering a wiring area and of increasing a shielding function of the wiring area.

2. Description of the Related Art

A light-transmissive input device is provided in a portable electronic device or the like. The light-transmissive input device is configured with a light-transmissive base material as a main body and is provided at a position covering a display device of a liquid crystal display panel or the like. An input operation may be performed by touching a display area of a display screen with a finger or the like while seeing through a display image.

As a method of detecting the input operation, an electrostatic capacitive type or a contact type is employed. In the electrostatic capacitive type, a light-transmissive X conductive layer extending in the X direction and a light-transmissive Y conductive layer extending in the Y direction oppose each other in a detection area, and a potential is alternately applied to the X conductive layer and the Y conductive layer. When a finger of a person substantially at a ground potential approaches, an electrostatic capacitance is formed between the X and Y conductive layers and the finger, and the voltage or current when the potential is applied to the X or Y conductive layer is changed. By detecting this change, the position that the finger approaches is detected. In the contact type, transmissive conductive layers that oppose each other are provided in a detection area, and a voltage is alternately applied to the conductive layers. When the one conductive layer pressed by a finger or a pin comes in contact with the other conductive layer, the position is detected as a change in resistance or the like.

The light-transmissive conductive layers are formed in the detection area, and display contents of the display device may be seen though the area. In the periphery of the detection area, a disposition area of a wiring pattern electrically connected to each of the conductive layers is provided. Regarding this wiring area, the following problems are present.

(a) When light from the display device is emitted from the rear, the wiring area in the periphery of the detection area needs to be covered. In a coordinate input device described in Japanese Unexamined Patent Application Publication No. 2005-173970, on the rear side of an upper light-transmissive substrate positioned at the uppermost surface, a decorative printing layer is formed in a frame shape, and the decorative printing layer covers the peripheral part of the input device.

However, in order for the decorative printing layer to effectively block the light emitted from the display device, the decorative printing layer needs to be thickly formed by alternately overlapping a white printing layer with a printing layer with a decorative color such as black so as to form the decorative printing layer. As pointed out in Japanese Unexamined Patent Application Publication No. 11-66996, when the decorative printing layer is thickened, an air gap is more likely to be formed in a surface base material where the decorative printing layer formed and an adhesive layer to which the base material is adhered therebelow. When the air gap is formed, due to reflection of light at the boundary surface between the air layer and the base material, there is a problem in that transmittance of the display light from the display device is reduced.

(b) In the case of the electrostatic capacitive input device, when a finger approaches the wiring area positioned in the periphery of the detection area, an electrostatic capacitance is formed between the finger and the wiring pattern and easily becomes the cause of erroneous detection.

Here, in input devices described in Japanese Unexamined Patent Application Publication Nos. 2009-169720 and 2005-337773, by covering the disposition area of the wiring pattern, it becomes difficult to cause erroneous detection when a finger approaches.

However, in the device described in Japanese Unexamined Patent Application Publication No. 2009-169720, the shielding layer is formed of the same ITO transparent conductive film as that of an electrode pattern. Since the shielding layer formed of the transparent conductive film remains in a wide range in the periphery of the detection area, in order to form the wiring area, an insulating layer is formed on the surface of the shielding layer, and the wiring pattern is disposed on the insulating layer. Due to the structure in which the insulating layer is interposed between the shielding layer and the wiring pattern, the structure of the input device becomes complex, resulting in an increase in the thickness.

In the device described in Japanese Unexamined Patent Application Publication No. 2005-337773, the disposition area of the wiring pattern is covered with a shielding member formed of a metal plate or the like. Since the shielding member is formed of the metal plate, a reduction in the thickness of the input device becomes difficult, resulting in an increase in the weight.

SUMMARY OF THE INVENTION

The present invention provides a light-transmissive input device capable of enhancing a blocking effect of display light in a decorative area even though a decorative layer is not made excessively thick.

The present invention also provides a light-transmissive input device capable of exhibiting an effective shielding effect using the same conductive material as that of a wiring pattern.

According to an aspect of the invention, a light-transmissive input device includes: a lower wiring surface and an upper wiring surface which are formed on a light-transmissive base material and are disposed at a vertical interval; a light-transmissive lower conductive layer which is formed on the lower wiring surface; a lower wiring pattern which is formed of a non-light-transmissive conductive material and is formed on a first side so as to be electrically connected to the lower conductive layer; a light-transmissive upper conductive layer which is formed on the upper wiring surface; an upper wiring pattern which is formed of a non-light-transmissive conductive material and is formed on a second side orthogonal to the first side so as to be electrically connected to the upper conductive layer; a lower shielding layer which is formed of the same conductive material as the lower wiring pattern on the lower wiring surface; and an upper shielding layer which is formed of the same conductive material as the upper wiring pattern on the upper wiring surface, wherein the lower shielding layer and the upper wiring pattern are disposed to vertically overlap each other, and the upper shielding layer and the lower wiring pattern are disposed to vertically overlap each other.

In the light-transmissive input device according to the aspect of the invention, the shielding layers are formed of the same material as that of the wiring patterns so that the shielding layer of the one wiring surface covers the wiring pattern of the other wiring surface. By covering the wiring pattern with the non-light-transmissive shielding layer, transmission of light by the wiring area may be blocked, and the shielding layer may be caused to function as a shielding layer for the opposing wiring pattern. Since the shielding layers are formed of the same conductive material as that of the wiring pattern, an insulating layer and the like do not need to be formed, and the structure of the surface of the wiring surface may be thinly configured.

According to the aspect of the invention, a structure may be employed in which a cover layer is formed on an upper side of the upper wiring surface, the cover layer has a light-transmissive transmission area, and a non-light-transmissive, frame-shaped decorative area surrounding the transmission area, and the lower shielding layer and the upper shielding layer vertically overlaps the decorative area.

In the configuration, since the wiring pattern of the wiring area positioned on the lower side of the decorative layer is covered with the shielding layer, when display light is emitted from the rear, projection of the design of the wiring pattern onto the decorative area may be prevented.

According to the aspect of the invention, it is preferable that at least one of the lower shielding layer and the upper shielding layer overlaps almost the entire area of the decorative area.

In the structure, since any of the lower and upper shielding layers is present in the decorative area, a light shielding effect of the decorative area may be enhanced, and thus the decorative printing layer of the decorative area and the like do not need to be made excessively thick.

In addition, according to the aspect of the invention, it is preferable that the lower shielding layer and the upper shielding layer do not protrude from the decorative area.

According to the aspect of the invention, at a bent portion of the frame-shaped decorative area, a width of at least one of the lower shielding layer and the upper shielding layer may be narrowed, such that the lower shielding layer and the upper shielding layer do not protrude from the decorative area.

The shape of the decorative area varies depending on the design of a portable device or the like in which the light-transmissive input device is mounted. Therefore, as the lower or upper shielding layer is thinly made at the bent portion of a corner portion of the decorative area, the shielding layer is easily prevented from protruding from the decorative area even though the decorative area may have any design.

According to the aspect of the invention, a non-light-transmissive lower land portion electrically connected to the lower wiring pattern is formed on the lower wiring surface, a non-light-transmissive upper land portion electrically connected to the upper wiring pattern is formed on the upper wiring surface, the lower land portion and the upper shielding layer vertically overlap each other, and the upper land portion and the lower shielding layer vertically overlap each other.

Otherwise, according to the aspect of the invention, a lower electrode layer is connected to an end portion of the lower conductive layer and is formed on the lower wiring surface integrally with the lower wiring pattern, an upper electrode layer is connected to an end portion of the upper conductive layer and is formed on the upper wiring surface integrally with the upper wiring pattern, the lower electrode layer and the upper shielding layer vertically overlap each other, and the upper electrode layer and the lower shielding layer vertically overlap each other.

In the configuration, the land portion or the electrode layer may be covered with the decorative area and the shielding layer, so that the design of the outer appearance of the device may be enhanced.

According to the aspect of the invention, the lower and upper shielding layers may be set to a ground potential and function as shielding layers.

Regarding the lower and upper wiring surfaces, since the shielding layer of the one wiring surface functions as the shielding layer of the wiring pattern of the other wiring surface, in the case of an electrostatic capacitive type, erroneous detection is easily prevented when a finger approaches the shielding area, and a possibility of a high-frequency signal from the display device affecting the wiring pattern may be reduced.

According to the aspect of the invention, the lower and upper wiring surfaces are formed on both surfaces of the single light-transmissive base material, and a change in a signal based on an electrostatic capacitance is detected when a finger approaches the lower and upper conductive layers.

In addition, the invention may be configured as a contact type touch panel in a resistive type in which a lower wiring surface formed in a lower sheet and an upper wiring surface formed in an upper sheet oppose each other via an air layer, an upper conductive layer comes in contact with a lower conductive layer when the upper sheet is pressed, and a contact position of a finger is detected from a change in the resistant at that time.

According to the aspect of the invention, since the shielding layer is formed of the same non-light-transmissive conductive material as that of the wiring pattern, the shielding layer functions as a layer for preventing leakage of light through the decorative area or functions as a shielding layer.

Since the shielding area is formed of the same material as that of the wiring pattern, thinning the structure of the surface of the wiring surface may be achieved, and thus a thin light-transmissive input device may be configured.

DESCRIPTION OF THE PREFERRED EMBODIMENTS

Figure 1:
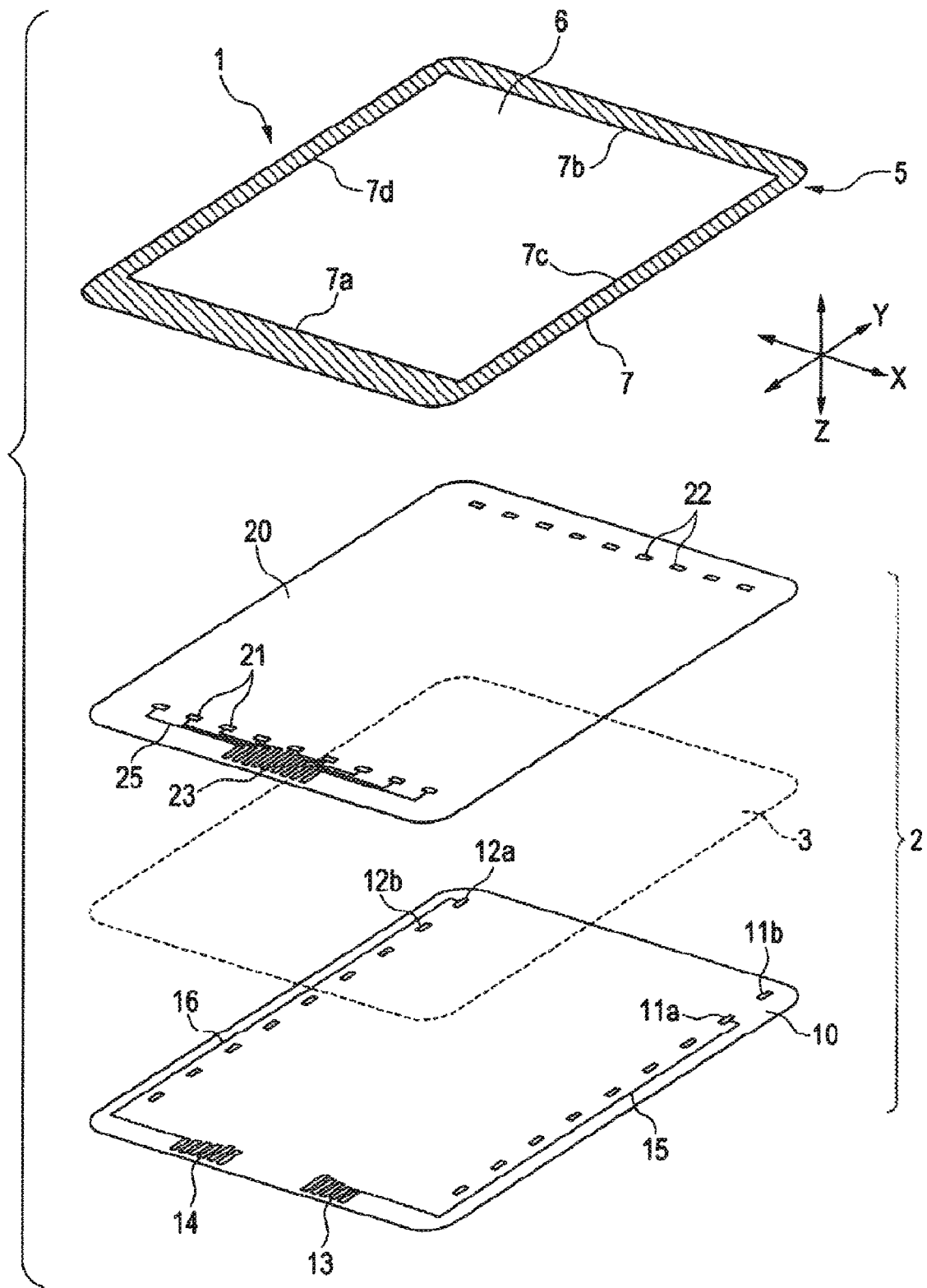
FIG. 1 is an exploded perspective view of a light-transmissive input device according to an embodiment of the invention.

A light-transmissive input device 1 illustrated in FIG. 1 is mounted in various electronic devices including portable devices such as mobile phones or portable information terminals, gaming devices, cameras, and video shooting devices. These devices have a display device, and in front of the display screen of the display device, the light-transmissive input device 1 is provided. The display device is of a self-luminous type such as a liquid crystal display panel having a light illumination device at the rear portion, or an electroluminescent panel.

The light-transmissive input device 1 has a detection panel 2 in an electrostatic capacitive detection type and a cover layer 5 overlapping therewith.

The detection panel 2 has a light-transmissive base material 3. The base material 3 is formed of a synthetic resin sheet or a glass plate. In this specification, light transmissivity means a state capable of transmitting light such as a transparent or translucent state, and means a state in which a total light transmittance is equal to or higher than 50%, and preferably equal to or higher than 80%.

Figure 2:
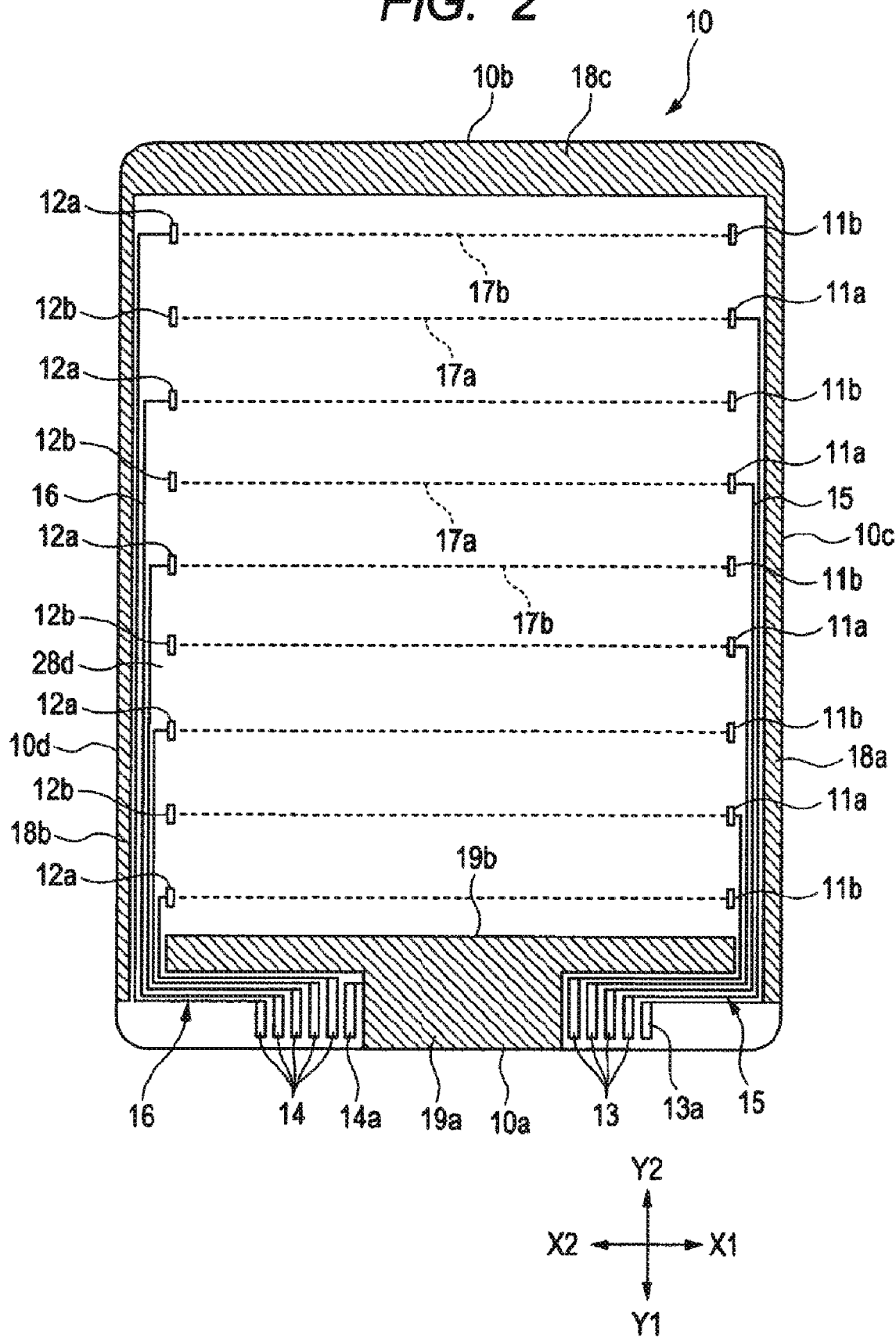
FIG. 2 is a plan view illustrating a lower wiring surface.
Figure 3:
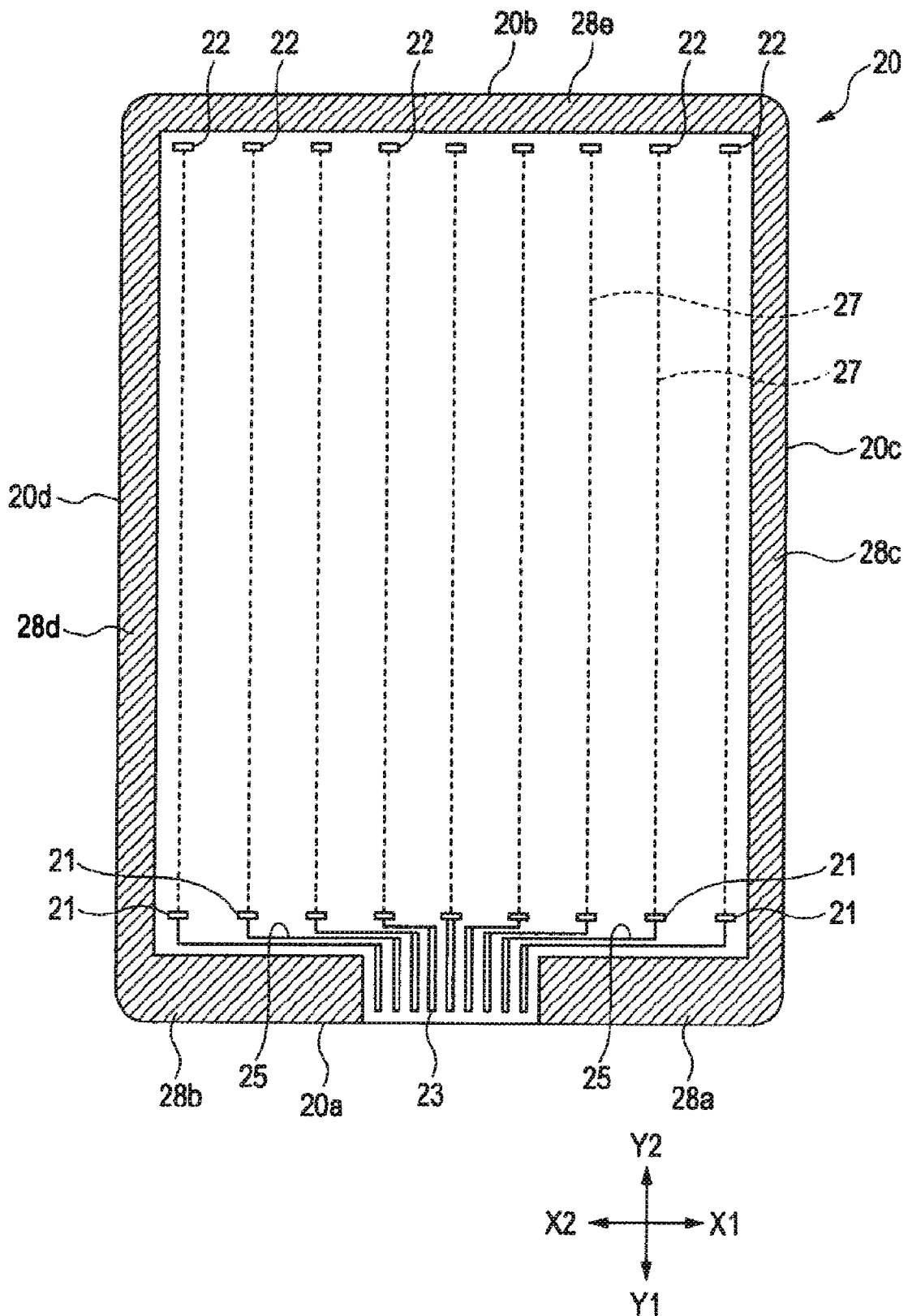
FIG. 3 is a plan view illustrating an upper wiring surface.

The detection panel 2 has a lower wiring surface 10 and an upper wiring surface 20. In FIG. 1, for convenience of illustration, the base material 3, the lower wiring surface 10, and the upper wiring surface 20 are illustrated to be separated in the vertical direction (Z direction), while the lower wiring surface 10 is the lower surface of the base material 3 and the upper wiring surface 20 is an upper surface of the base material 3. Each of layers of the lower wiring surface 10 illustrated in FIG. 2 is formed on the lower surface of the base material 3, and each of layers of the upper wiring surface 20 illustrated in FIG. 3 is formed on the upper surface of the base material 3. In addition, the figures from FIG. 2 are plan views of the lower wiring surface 10 and the upper wiring surface 20 viewed from the upper side which is the cover layer 5 side.

In FIG. 2, the structure of the lower wiring surface 10 is illustrated in detail.

The lower wiring surface 10 has a side 10a on the front side (Y1 side), a side 10b on the back side (Y2 side), a side 10c on the right side (X1 side), and a side 10d on the left side (X2 side). The sides 10c and 10d on both the left and right sides are first sides.

On the inner side of the side 10c on the right side, a plurality of lower electrode layers 11a for connection and a plurality of lower electrode layers 11b for terminals are formed. The lower electrode layers 11a for connection and the lower electrode layers 11b for terminals are alternately disposed and are formed to be lined in a row in the Y1-Y2 direction. On the inner side of the side 10d on the left side, a plurality of lower electrode layers 12a for connection and a plurality of lower electrode layers 12b for terminals are formed. The lower electrode layers 12a for connection and the lower electrode layers 12b for terminals are alternately disposed and are formed to be lined in a row in the Y1-Y2 direction.

As illustrated in FIG. 2, the lower electrode layers 11a for connection on the right side and the lower electrode layers 12b for terminals on the left side oppose each other in the Y1-Y2 direction, and the lower electrode layers 11b for terminals on the right side and the lower electrode layers 12a for connection on the left side oppose each other in the Y1-Y2 direction.

The end portion of the right side of an X conductive layer 17a extending in a line form in the Y1-Y2 direction is connected to the lower electrode layer 11a for connection, and the end portion on the left side thereof is connected to the lower electrode layer 12b for terminals. The end portion of the right side of an X conductive layer 17b extending in the line form in the Y1-Y2 direction is connected to the lower electrode layer 11b for terminals, and the end portion on the left side thereof is connected to the lower electrode layer 12a for connection. The X conductive layers 17a and 17b are formed of a transparent electrode such as ITO.

In the side of the lower wiring surface 10 on the Y1 side, a plurality of lower land portion 13 are formed on the right side, and a plurality of lower land portions 14 are formed on the left side. A lower wiring pattern 15 extends in one body from each of the lower electrode layers 11a for connection provided along the side 10c on the right side, and the lower wiring patterns 15 are connected to the lower land portions 13, respectively. The four lower electrode layers 11a for connection and the four lower land portions 13 are connected one-on-one by the lower wiring patterns 15. A lower wiring pattern 16 extends in one body from each of the lower electrode layers 12a for connection provided along the side 10d on the left side, and the lower wiring patterns 16 are connected to the lower land portions 14, respectively. The five lower electrode layers 12a for connection and the five lower land portions 14 are connected one-on-one by the lower wiring patterns 16.

The lower electrode layers 11a, 11b, 12a, and 12b, the lower land portions 13 and 14, and the lower wiring patterns 15 and 16 are all formed of a non-light-transmissive conductive material. The conductive material is a metal with a smaller specific resistance than that of the transparent conductive material such as ITO of which the X conductive layers 17a and 17b are configured, for example, silver, copper, or gold.

As illustrated in FIG. 2, a lower shielding layer 18a is formed between the side 10c on the right side of the lower wiring surface 10 and the wiring area of the lower wiring pattern 15, and a lower shielding layer 18b is formed between the side 10d on the left side and the wiring area of the lower wiring pattern 16. In addition, on the inner side of the side 10b on the back side, a lower shielding layer 18c with a relatively large width tin the Y1-Y2 direction is formed. The lower shielding layers 18a, 18b, and 18c are formed of the same conductive material as the lower electrode layers 11a, 11b, 12a, and 12b and the lower wiring patterns 15 and 16. The lower shielding layers 18a, 18b, and 18c are continuously formed in one body and are completely separated from the lower electrode layers 11a, 11b, 12a, and 12b and the lower wiring patterns 15 and 16.

On the inner side of the side 10a on the front side of the lower wiring surface 10, a lower shielding layer 19a is formed between the left and right lower land portions 13 and 14. A lower shielding layer 19b extending consecutively from the lower shielding layer 19a to the left and right is positioned further towards the Y2 side than the left and right lower land portions 13 and 14. The lower shielding layers 19a and 19b are formed of the same conductive material as that of lower electrode layers 11a, 11b, 12a, and 12b and the lower wiring patterns 15 and 16. The lower shielding layers 19a and 19b are completely separated from the lower wiring patterns 15 and 16 and the lower land portions 13 and 14.

The lower shielding layers 18a, 18b, and 18c and the lower shielding layers 19a and 19b are set to a ground potential. For example, a part of the lower land portion 13 becomes a ground land portion 13a and is electrically connected to the lower shielding layer 18a. In addition, a part of the lower land portion 14 becomes a ground land portion 14a and is electrically connected to the lower shielding layer 19a.

Each of the layers of the upper wiring surface 10 is patterned in the following manner.

The base material 3 illustrated in FIG. 1 uses a material in which a film of an ITO transparent electrode material and a film of the non-light-transmissive conductive material such as silver are laminated on the upper surface. The conductive material is removed from the center area, and the transparent electrode material is patterned through etching in the area from which the conductive material is removed, thereby forming the X conductive layers 17a and 17b.

In addition, the conductive material such as silver remaining in the periphery parts is etched, thereby patterning the lower electrode layers 11a, 11b, 12a, and 12b, the lower land portions 13 and 14, the lower wiring patterns 15 and 16, and the lower shielding layers 18a, 18b, 18c, 19a, and 19b. In this case, the lower electrode layers 11a, 11b, 12a, and 12b, the lower land portions 13 and 14, the lower wiring patterns 15 and 16, and the lower shielding layers 18a, 18b, 18c, 19a, and 19b have a two-layer structure of the transparent conductive material and the non-light-transmissive conductive material.

As another patterning method, the base material 3 uses a material in which only a film of the ITO transparent electrode material is formed, and the transparent electrode material is etched, thereby forming the X conductive layers 17a and 17b. Thereafter, using a printing paste containing the conductive material such as a silver paste, the lower electrode layers 11a, 11b, 12a, and 12b, the lower land portions 13 an 14, the lower wiring patterns 15 and 16, and the lower shielding layers 18a, 18b, 18c, 19a, and 19b are printed.

FIG. 3 illustrates the details of the upper wiring surface 20.

The upper wiring surface 20 has a side 20a on the front side, a side 20b on the back side, a side 20c on the right side, and a side 20d on the left side. The side 20a on the front side is a second side.

On the inner side of the side 20a on the front side, a plurality of upper electrode layers 21 for connection are provided. The upper electrode layers 21 for connection are linearly lined up in the X1-X2 direction at a predetermined pitch. On the inner side of the side 20b on the back side, a plurality of upper electrode layers 22 for terminals are formed. The upper electrode layers 22 for terminals are linearly lined up in the X1-X2 direction at a predetermined pitch.

In the upper wiring surface 20, a plurality of Y conductive layers 27 linearly extending in the Y1-Y2 direction are formed, and each of the Y conductive layers 27 is connected to the upper electrode layer 21 for connection and the upper electrode layer 22 for terminals. The Y conductive layer 27 is formed of the transparent electrode material such as ITO.

On the inner side of the side 20a on the front side, a plurality of upper land portions 23 are formed at the center part. The upper land portions 23 and the upper electrode layers 21 are connected one-on-one by upper wiring patterns 25.

On the right side of the upper land portion 23, an upper shielding layer 28a is formed between the side 20a and the wiring area of the upper wiring pattern 25, and on the left side, an upper shielding layer 28b is formed between the side 20a and the wiring area of the upper wiring pattern 25. In addition, an upper shielding layer 28c is formed along the side 20c on the right side, an upper shielding layer 28d is formed along the side 20d on the left side, and an upper shielding layer 28e is formed along the side 20b on the back side.

The upper shielding layers 28a, 28b, 28c, 28d, and 28e are continuously formed in one body. The upper shielding layers 28a, 28b, 28c, 28d, and 28e are formed to be completely separated from the upper electrode layers 21 and 22, the upper land portion 23, and the upper wiring pattern 25. The upper shielding layers 28a, 28b, 28c, 28d, and 28e are connected to an upper land portion (not illustrated) for grounding and are set to a ground potential.

The upper wiring surface 20 is patterned in the same process of forming the lower wiring surface 10 illustrated in FIG. 2 on the lower surface of the base material 3. In addition, the transparent electrode material and the non-light-transmissive conductive material for use are the same as those of the lower wiring surface 10.

For example, the upper electrode layers 21 and 22, the upper land portion 23, the upper wiring pattern 25, and the upper shielding layers 28a, 28b, 28c, 28d, and 28e are formed by overlapping the transparent electrode material such as ITO with the non-light-transmissive conductive material such as silver. Otherwise, they are formed on a printing layer such as a silver paste.

Figure 4:
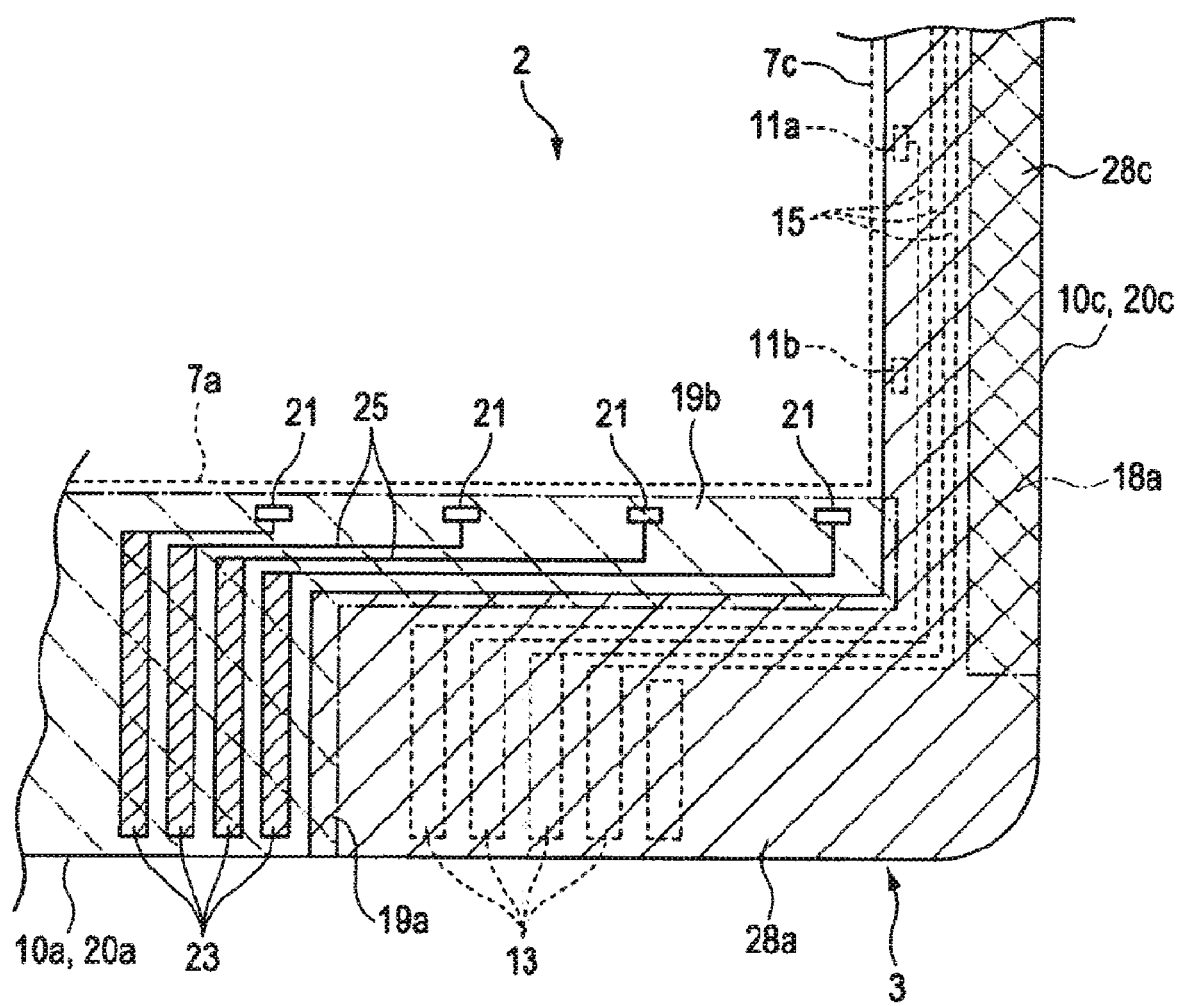
FIG. 4 is a partial plan view illustrating a state where the upper wiring surface and the lower wiring surface overlap each other.
Figure 5:
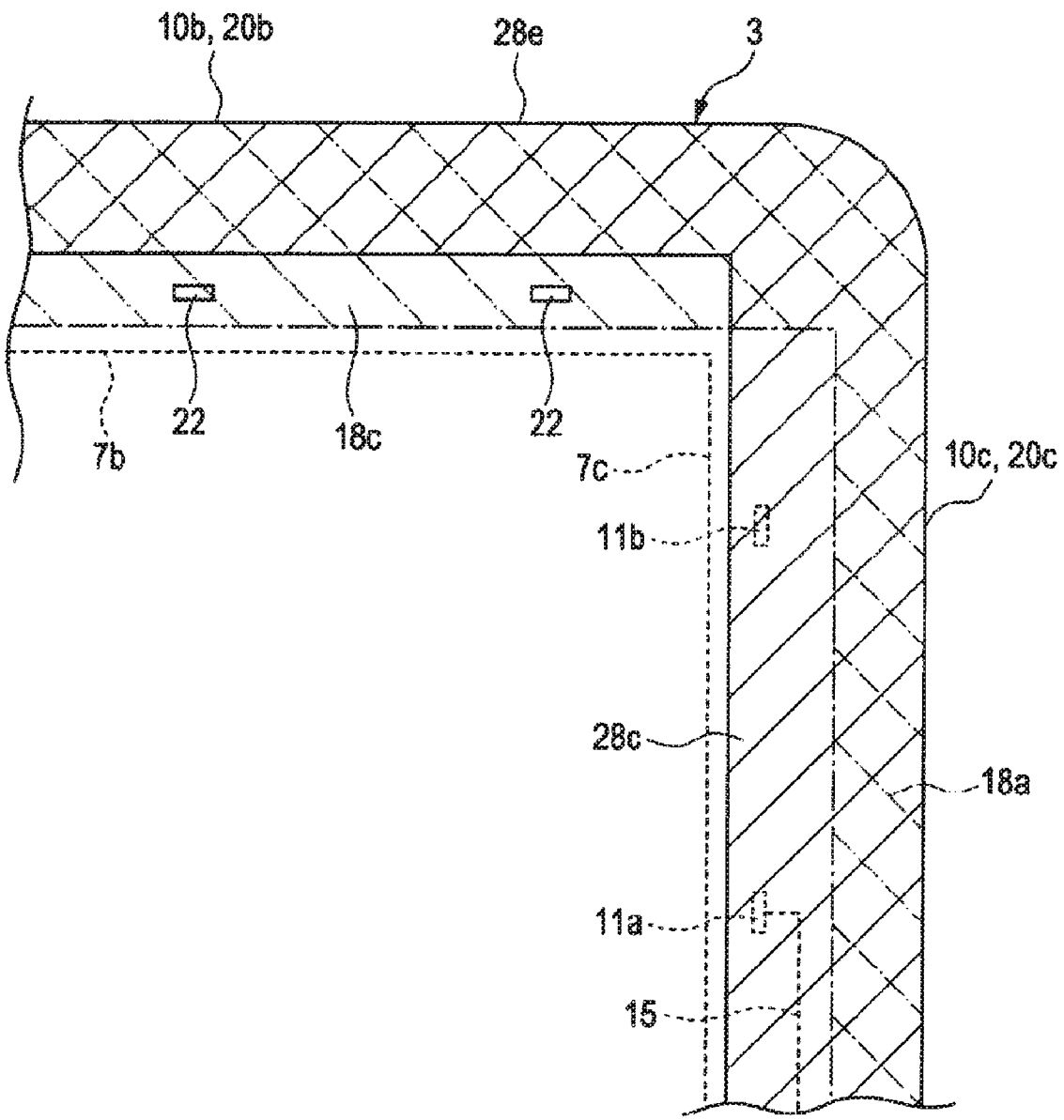
FIG. 5 is a partial plan view illustrating the state where the upper wiring surface and the lower wiring surface overlap each other.

FIGS. 4 and 5 are partial side views of both the lower wiring surface 10 formed on the lower surface of the base material 3 and the upper wiring surface 20 formed on the upper surface as viewed from the upper side which is the cover layer 5 side.

As illustrated in FIG. 4, the lower electrode layers 11a and 11b positioned on the inner side of the side 10c on the right side of the lower wiring surface 10 and the wiring area of the lower wiring pattern 15 are covered with the upper shielding layer 28c on the right side of the upper wiring surface 20 from the upper side. The lower shielding layer 18a formed on the inner side of the side on the right side of the lower wiring surface 10 is also covered with the upper shielding layer 28c from the upper side. The lower land portion 13 and the wiring area of the lower wiring pattern 15 positioned on the inner side of the side 10a on the front side of the lower wiring surface 10 are covered with the upper shielding layer 28a formed in the upper wiring surface 20 from the upper side.

As illustrated in FIG. 4, the upper land portion 23 formed in the upper wiring surface 20 is covered with the lower shielding layer 19a in the lower wiring surface 10 from the lower side. The upper electrode layers 21 for connection and the wiring area of the upper wiring pattern 25 formed in the upper wiring surface 20 are covered with the lower shielding layer 19b formed in the lower wiring surface 10 from the lower side.

As illustrated in FIG. 5, the upper electrode layers 22 for terminals and the upper shielding layer 28e formed in the upper wiring surface 20 are covered with the lower shielding layer 18c formed in the lower wiring surface 10 from the lower side.

As illustrated in FIG. 1, the cover layer 5 positioned at the uppermost layer is formed of a thin glass substrate or a light-transmissive resin sheet. The cover layer 5 has a transmission area 6 at the center and a frame-shaped decorative area 7 is formed in the periphery of the transmission area 6. In the decorative area 7, a decorative printing layer is formed on the lower surface of the glass substrate or the light-transmissive resin sheet. Otherwise, the decorative layer is formed by deposition or the like. The decorative area 7 has a shape and colors according to the design of the portable device in which the light-transmissive input device 1 is mounted.

Edge sides 7a, 7b, 7c, and 7d on the inner side of the decorative area 7 are linear, and the transmission area 6 is a quadrangular area surrounded by the edge sides 7a, 7b, 7c, and 7d.

In FIG. 4, the edge sides 7a and 7c of the decorative area 7 are indicated by the broken lines, and in FIG. 5, the edge sides 7b and 7c of the decorative area 7 are indicated by the broken lines.

As illustrated in FIGS. 4 and 5, in the light-transmissive input device 1, the lower electrode layers 11a, 11b, 12a, and 12b, the lower land portions 13 and 14, the lower wiring patterns 15 and 16, and the lower shielding layers 18a, 18b, 18c, 19a, and 19b, which are formed in the lower wiring surface 10, are hidden at the lower side of the decorative area 7 of the cover layer 5. In addition, the upper electrode layers 21 and 22, the upper land portions 23, the upper wiring pattern 25, and the upper shielding layers 28a, 28b, 28c, 28d, and 28e, which are formed in the upper wiring surface 20, are also hidden at the lower side of the decorative area 7 of the cover layer 5.

As illustrated in FIGS. 4 and 5, the lower electrode layers 11a, 11b, 12a, and 12b of the lower wiring surface 10, the lower land portions 13 and 14, and the lower wiring patterns 15 and 16 are covered with the upper shielding layers 28a, 28b, 28c, 28d, and 28e of the upper wiring surface 20, and the upper electrode layers 21 and 22 of the upper wiring surface 20, the upper land portion 23, and the upper wiring pattern 25 are covered with the lower shielding layers 18a, 18b, 18c, 19a, and 19b of the lower wiring surface 10. Therefore, when display light from the display device reaches the rear portion, projection of the shapes of the electrode layer, the land portions, and the wiring patterns onto the decorative area 7 may be prevented.

As illustrated in FIGS. 4 and 5, at least one of the lower shielding layers 18a, 18b, 18c, 19a, and 19b and the upper shielding layers 28a, 28b, 28c, 28d, and 28e is surely present at least along the edge sides 7a, 7b, 7c, and 7d of the decorative area 7. That is, in the area along the edge sides 7a, 7b, 7c, and 7d, the lower shielding layer is present at a space where the upper shielding layer is not present, and the upper shielding layer is present at a space where the lower shielding layer is not present. Therefore, in the peripheral part of the transmission area 6 that transmits the display light of the display device, a shielding effect of the display light may be enhanced.

Moreover, in the light-transmissive input device 1, at least one of the lower shielding layers 18a, 18b, 18c, 19a, and 19b and the upper shielding layers 28a, 28b, 28c, 28d, and 28e is surely present in almost the entire area of the decorative area 7. In almost the entire area of the decorative area 7, since the lower shielding layer is present at a space where the upper shielding layer is not present and the upper shielding layer is present at a space where the lower shielding layer is not present, the shielding effect of the display light from the display device may be enhanced.

Therefore, the decorative printing layer formed on the lower surface of the cover layer 5 may be made thin. The cover layer 5 is fixed to the upper surface of the detection panel 2 via a light-transmissive adhesive layer. However, since the decorative printing layer is able to be made thin, the height different of the edge portion of the decorative printing layer may be reduced, and thus inconvenience such as remaining of an air layer in the adhesive layer is easily prevented.

In addition, the lower shielding layers 18a, 18b, 18c, 19a, and 19b and the upper shielding layers 28a, 28b, 28c, 28d, and 28e do not protrude from the edge sides 7a, 7b, 7c, and 7d of the decorative area 7. Therefore, display contents emitted from the display device are not impeded by the lower shielding layer or the upper shielding layer.

In the detection panel 2, a voltage is sequentially applied to the plurality of X conductive layers 17a and 17b, and at a timing different from this, a voltage is sequentially applied to the plurality of Y conductive layers 27. When a certain point of the transmission area 6 of the cover layer 5 is touched by a finger, the current or voltage is changed according to the electrostatic capacitance formed between the X conductive layers 17a and 17b and the finger, and the current or voltage is changed according to the electrostatic capacitance formed between the Y conductive layers 27 and the finger. By analyzing the change in the current or the voltage, the position touched by the finger may be obtained.

As illustrated in FIGS. 4 and 5, the lower wiring patterns 15 and 16 of the lower wiring surface 10 are covered with the upper shielding layers 28a, 28b, 28c, and 28d of the upper wiring surface 20 from the upper side. Therefore, even though a finger approaches the wiring area of the lower wiring patterns 15 and 16, formation of an electrostatic capacitance between the lower wiring patterns 15 and 16 and the finger may be suppressed, so that erroneous detection of the contact position of the finger may be prevented.

The upper land portion 23 and the lower wiring pattern 25 provided in the upper wiring surface 20 are covered with the lower shielding layers 19 and 19b formed in the lower wiring surface 10 from the lower side. Therefore, the influence of high-frequency noise emitted from the display device such as a liquid crystal display panel on the upper land portion 23 and the upper wiring pattern 25 may be prevented.

In the light-transmissive input device, the lower electrode layers 11a, 11b, 12a, and 12b, the lower land portions 13 and 14, the lower wiring patterns 15 and 16, and the lower shielding layers 18a, 18b, 18c, 19a, and 19b, which are formed in the lower wiring surface 10, are formed on the lower surface of the base material 3 with the same thickness. Similarly, the upper electrode layers 21 and 22, the upper land portion 23, and the upper wiring pattern 25 of the upper wiring surface 20 are formed on the upper surface of the base material 3 also with the same thickness. Therefore, each of the layers on both the upper and lower surfaces of the base material 3 does not become excessively thick, such that the detection panel 2 may be formed with a small thickness.

Figure 6:
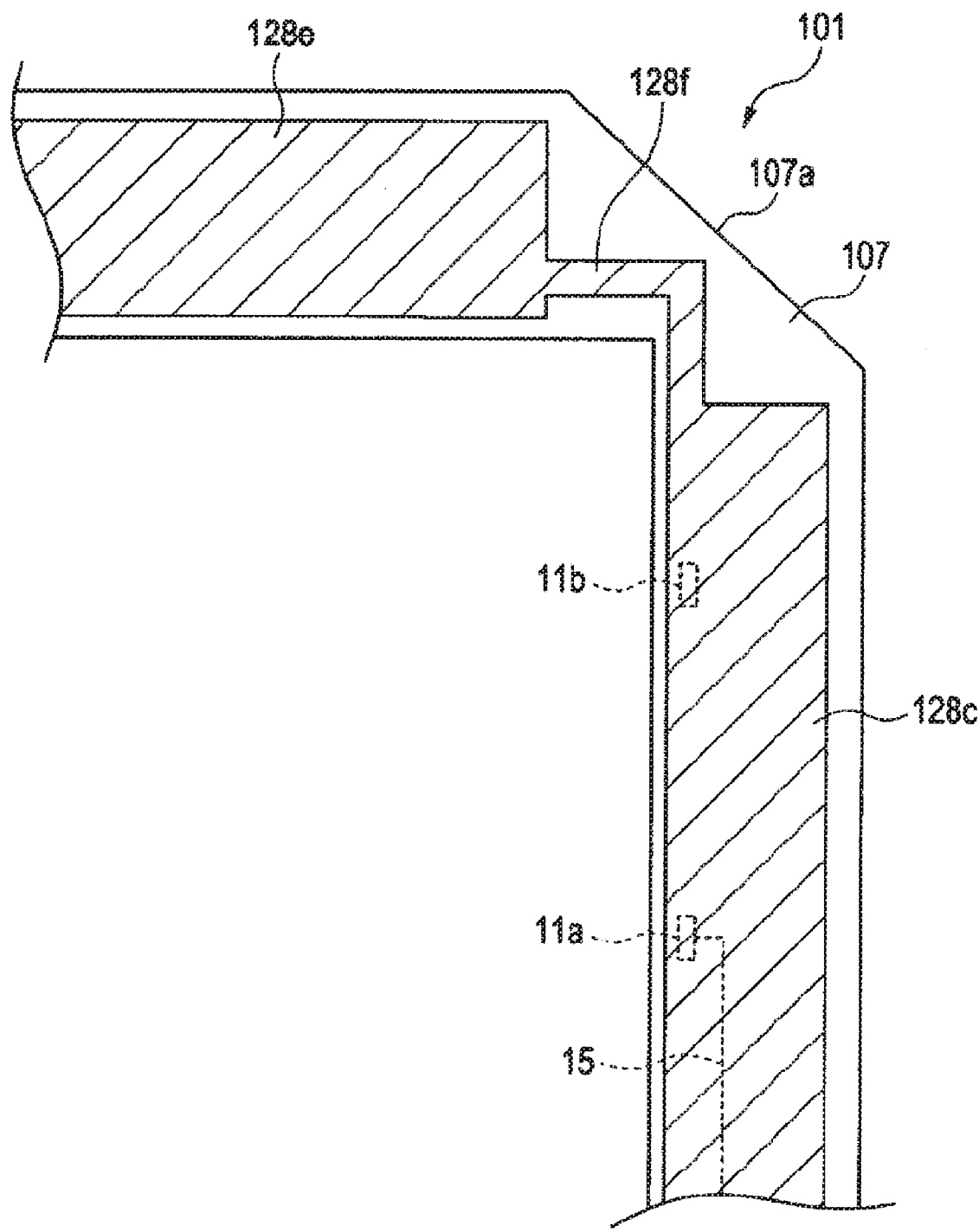
FIG. 6 is a partial plan view illustrating an example of the formation pattern of an upper shielding layer.

FIG. 6 is a partial plan view illustrating a part of a light-transmissive input device 101 according to a second embodiment of the invention.

The decorative area 7 formed in the cover layer 5 is set according to the design of the portable device or the like. In the example of FIG. 6, an angular portion 107a is formed in a decorative area 107, and the area of a bent portion of the decorative area 107 becomes excessively thin. In this case, an upper shielding layer 128c and an upper shielding layer 128e formed in the upper wiring surface 20 are formed on the lower side of the decorative area 107 with areas as wide as possible. However, at a connection portion of the upper shielding layer 128c and the upper shielding layer 128e, the width of an upper shielding layer 128f is thinned in one stage.

Accordingly, even though a part with a narrow area is present in the decorative area due to the design of the decorative area, the upper shielding portion may be prevented from protruding. This may be similarly applied to the lower shielding layer.

It should be understood by those skilled in the art that various modifications, combinations, sub-combinations and alterations may occur depending on design requirements and other factors insofar as they are within the scope of the appended claims of the equivalents thereof.

What is claimed is:
1. A light-transmissive input device comprising:
a lower surface and an upper surface which are formed on a light-transmissive base material and are disposed at a vertical interval;
a light-transmissive lower conductive layer which is formed on the lower surface;
a lower wiring pattern which is made of a non-light-transmissive conductive material and is formed along a first side of the lower surface so as to be electrically connected to the lower conductive layer;
a light-transmissive upper conductive layer which is formed on the upper surface;

an upper wiring pattern which is made of a non-light-transmissive conductive material and is formed along a second side of the upper surface orthogonal to the first side so as to be electrically connected to the upper conductive layer;

a lower shielding layer which is made of the same conductive material as the lower wiring pattern and is formed on the lower surface separately from the lower wiring pattern, the lower shielding layer vertically overlying the upper wiring pattern;

an upper shielding layer which is formed of the same conductive material as the upper wiring pattern and is formed on the upper surface separately from the upper wiring pattern, the upper shielding layer vertically overlying the lower wiring pattern; and a cover layer which is formed over the upper surface, the cover layer including:
a light-transmissive transmission area, and
a non-light-transmissive, frame-shaped decorative area surrounding the transmission area, and
the decorative area vertically overlying the lower shielding layer and the upper shielding layer.

2. The light-transmissive input device according to claim 1, further comprising:
a lower electrode layer which is connected to an end portion of the light-transmissive lower conductive layer and is formed on the lower surface integrally with the lower wiring pattern; and
an upper electrode layer which is connected to an end portion of the light-transmissive upper conductive layer and is formed on the upper surface integrally with the upper wiring pattern,
wherein the upper shielding layer vertically overlies the lower electrode layer, and the lower shielding layer vertically overlies the upper electrode layer.

3. The light-transmissive input device according to claim 2, wherein
a plurality of the lower electrode layers are disposed on the lower surface along the first side, each of the lower electrode layers being positioned on an inner side further away from the first side than the lower wiring pattern,
a plurality of the upper electrode layers are disposed on the upper surface along the second side, each of the lower electrode layers being positioned on an inner side further away from the second side than the upper wiring pattern,
the upper shielding layer has an area overlying both of the lower wiring pattern and the lower electrode layer, and
the lower shielding layer has an area overlying both of the upper wiring pattern and the upper electrode layer.

4. The light-transmissive input device according to claim 1, further comprising:
a non-light-transmissive lower land portion which is electrically connected to the lower wiring pattern and is formed on the lower surface; and
a non-light-transmissive upper land portion which is electrically connected to the upper wiring pattern and is formed on the upper surface,
wherein the upper shielding layer vertically overlies the lower land portion, and the lower shielding layer vertically overlies the upper land portion.

5. The light-transmissive input device according to claim 4, wherein
a plurality of the non-light-transmissive lower land portions are disposed on the lower surface separately from each other, and the lower shielding layer is provided between the lower land portions, and
the upper shielding layer is provided on both sides of a plurality of the upper land portions on the upper surface.

6. The light-transmissive input device according to claim 1, wherein the lower and upper shielding layers are set to a ground potential and function as electrical shielding layers.

7. The light-transmissive input device according to claim 4, wherein
the lower shielding layer is electrically connected to any ground land portion from among a plurality of the lower land portions so as to be set to a ground potential,
the upper shielding layer is electrically connected to any ground land portion from among a plurality of the upper land portions so as to be set to the ground potential, and
both of the upper and lower shielding layers function as electrical shielding layers.

8. The light-transmissive input device according to claim 5, wherein
the lower shielding layer is electrically connected to any ground land portion from among the plurality of the lower land portions so as to be set to a ground potential,
the upper shielding layer is electrically connected to any ground land portion from among the plurality of the upper land portions so as to be set to the ground potential, and
both of the upper and lower shielding layers function as electrical shielding layers.

9. The light-transmissive input device according to claim 1, wherein both of the lower and upper shielding layers do not protrude from the decorative area.

10. The light-transmissive input device according to claim 1, wherein substantially an entire area corresponding to the decorative area is provided with at least one of the lower and upper shielding layers is provided on an area the decorative area.

11. The light-transmissive input device according to claim 10, wherein the lower and upper shielding layers overlap each other within the area corresponding to the decorative area.

12. The light-transmissive input device according to claim 9, wherein, at a bent portion of the frame-shaped decorative area, a width of at least one of the lower and upper shielding layers is narrowed, such that the lower and upper shielding layers do not protrude from the decorative area.

13. The light-transmissive input device according to claim 1, wherein
the lower and upper surfaces are formed on respective surfaces of the single light-transmissive base material, and
a change in a signal based on an electrostatic capacitance is detected when a finger approaches the lower and upper conductive layers.

14. The light-transmissive input device according to claim 2, wherein
a plurality of the lower electrode layers are formed on the lower surface at an interval in a direction along the second side, and the lower light-transmissive conductive layer is formed between the lower electrode layers which form a pair at the interval in the direction along the second side, and
a plurality of the upper electrode layers are formed on the upper surface at an interval in a direction along the first side, and the light-transmissive upper conductive layer is formed between the upper electrode layers which form a pair at the interval in the direction along the first side.

15. The light-transmissive input device according to claim 3,
a plurality of the lower electrode layers are formed on the lower surface at an interval in a direction along the second side, and the lower light-transmissive conductive layer is formed between the lower electrode layers which form a pair at the interval in the direction along the second side, and a plurality of the upper electrode layers are formed on the upper surface at an interval in a direction along the first side, and the light-transmissive upper conductive layer is formed between the upper electrode layers which form a pair at the interval in the direction along the first side.

16. The light-transmissive input device according to claim 1, wherein the lower surface formed on a lower sheet and the upper surface formed on an upper sheet oppose each other via an air layer, and the light-transmissive upper conductive layer comes in contact with the light-transmissive lower conductive layer when the upper sheet is pressed, and a contact position of a finger is detected from a change in resistance at this time.

17. A method of manufacturing a light-transmissive device comprising:

forming a light-transmissive lower conductive layer on a lower surface of a light-transmissive base material;

forming a non-light-transmissive conductive lower wiring pattern along a first side of the lower surface so as to be electrically connected to the lower light-transmissive conductive layer;

forming a light-transmissive upper conductive layer on an upper surface of the light-transmissive base material, the upper surface and the lower surface being disposed at a vertical interval;

forming a non-light-transmissive conductive upper wiring pattern along a second side of the upper surface orthogonal to the first side so as to be electrically connected to the light-transmissive upper conductive layer;

forming a lower shielding layer which is made of the same conductive material as the lower wiring pattern, on the lower surface separately from the lower wiring pattern, the lower shielding layer vertically overlying the upper wiring pattern;

forming an upper shielding layer which is made of the same conductive material as the upper wiring pattern, on the upper surface separately from the upper wiring pattern, the upper shielding layer vertically overlying the lower wiring pattern; and disposing a cover layer on an upper side of the upper surface, the cover layer having a light-transmissive transmission area and a non-light-transmissive, frame-shaped decorative area surrounding the transmission area, the decorative area vertically overlying the lower and upper shielding layers.

18. The method according to claim 17, further comprising:

forming, on the lower surface, a lower electrode layer which is connected to an end portion of the light-transmissive lower conductive layer and is formed integrally with the lower wiring pattern; and forming, on the upper surface, an upper electrode layer which is connected to an end portion of the light-transmissive upper conductive layer and is formed integrally with the upper wiring pattern, wherein the upper shielding layer vertically overlies the lower electrode layer, and the lower shielding layer vertically overlies the upper electrode layer.

19. The method according to claim 18, wherein a plurality of the lower electrode layers are formed on the lower surface along the first side so as to be positioned on an inner side further away from the first side than the lower wiring pattern, a plurality of the upper electrode layers are formed on the upper wiring along the second side so as to be positioned on an inner side further away from the second side than the upper wiring pattern, the upper shielding layer is formed to have an area overlying both of the lower wiring pattern and the lower electrode layer, and the lower shielding layer is formed to have an area overlying both of the upper wiring pattern and the upper electrode layer.

20. The method according to claim 19, further comprising:

forming, on the lower surface, a non-light-transmissive lower land portion which is electrically connected to the lower wiring pattern; and forming, on the upper surface, a non-light-transmissive upper land portion which is electrically connected to the upper wiring pattern, wherein the upper shielding layer vertically overlies the lower land portion, and the lower shielding layer vertically overlies the upper land portion.

21. The method according to claim 20, further comprising:

providing a light-transmissive substrate having the lower surface and the upper surface both of which having a film of a transparent electrode material and a film of a non-light-transmissive conductive material laminated thereon, partially removing the film of the non-light-transmissive conductive material from the lower surface, and patterning the film of the transparent electrode material in the removed area by etching, thereby forming the light-transmissive lower conductive layer;

patterning an area of the film of the non-light-transmissive conductive material remaining on the lower surface, thereby forming the lower wiring pattern, the lower electrode layer, the lower land portion, and the lower shielding layer, which have a two-layer structure including the transparent electrode material and the non-light-transmissive conductive material;

partially removing the film of the non-light-transmissive conductive material from the upper surface, and patterning the film of the transparent electrode material in the removed area by etching, thereby forming the light-transmissive upper conductive layer; and patterning an area of the film of the non-light-transmissive conductive material remaining on the upper surface, thereby forming the upper wiring pattern, the upper electrode layer, the upper land portion, and the upper shielding layer, which have a two-layer structure including the transparent electrode material and the non-light-transmissive conductive material.

22. The method according to claim 20, further comprising:

providing a light-transmissive substrate having the lower surface and the upper surface both of which having a film of a transparent electrode material formed thereon, patterning the film of the transparent electrode material on the lower wiring layer by etching, thereby forming the light-transmissive lower conductive layer;

forming the lower electrode layer, the lower wiring pattern, the lower land portion, and the lower shielding layer by printing, using a printing paste containing a non-light-transmissive conductive material;

patterning the film of the transparent electrode material on the upper wiring layer by etching, thereby forming the light-transmissive upper conductive layer; and forming the upper electrode layer, the upper wiring pattern, the upper land portion, and the upper shielding layer by printing, using a printing paste containing a non-light-transmissive conductive material.

* * * * *